UNITED STATES PATENT OFFICE.

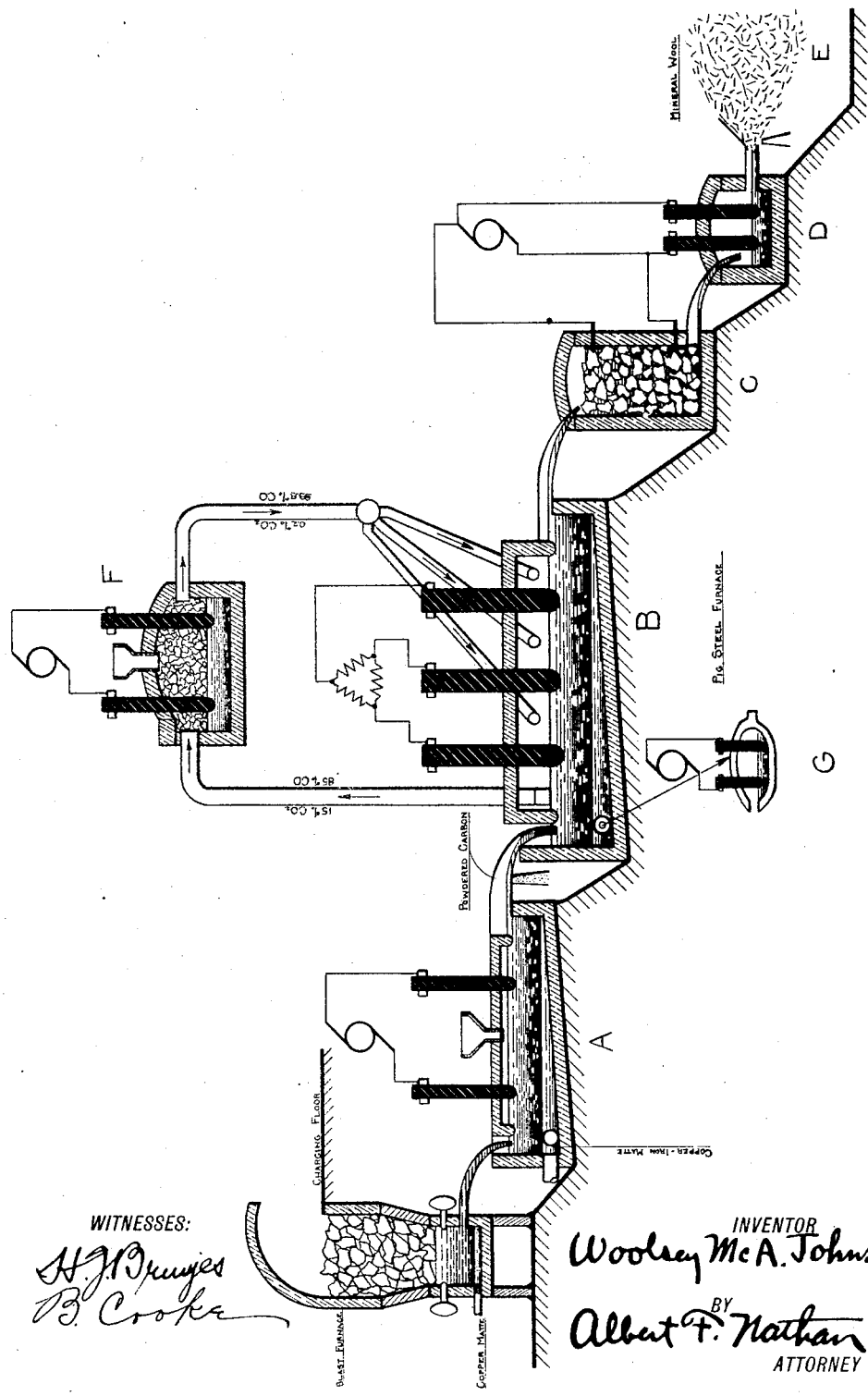

WOOLSEY McA. JOHNSON, OF HARTFORD, CONNECTICUT.

STEEL-MAKING PROCESS.

1,300,410.  Specification of Letters Patent.  Patented Apr. 15, 1919.

Application filed May 3, 1915. Serial No. 25,378.

*To all whom it may concern:*

Be it known that I, WOOLSEY McA. JOHNSON, a citizen of the United States, and residing at Hartford, in the county of Hartford and State of Connecticut, have invented a new and Improved Steel-Making Process, of which the following specification is a full disclosure.

This invention deals with a method of recovering metallic values from slag and for making a commercially efficient precipitating agent for copper solutions.

There have been many attempts to find an all round practical precipitating agent for the copper-bearing solutions in leaching processes.

I now have devised an improved precipitating agent and process for making the same which briefly described consists in taking ferruginous lead or copper blast furnace slag and reducing the iron out of it in the form of steel (by a counter-current cycle) by decarbonizing the iron continuously. This steel is then shotted in water and used to precipitate the copper according to equation:

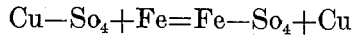

$$Cu-So_4 + Fe = Fe-So_4 + Cu$$

As this steel is practically chemically pure, the cement copper will be as high-grade (92% Cu) as in the old Henderson process in which steel barrel-hoops were used.

My preferred procedure may best be understood by referring to the annexed drawing depicting my process diagrammatically.

The slag is first purified by passing through an electrically-heated settler A which is a metallurgical apparatus preferably made oval-like in horizontal section to form a furnace of the slag-resistance type.

Into this is blown coal to an amount of about .5% of the bath, preferably by means of impinging jets of CO, or other reducing gas. This coal in the form of a powder will in practice be introduced into the furnace through a suitably located hopper, and the gas jets will be located above the bath and will serve to mechanically agitate the coal to mix it better and more intimately with the slag. This slag, thoroughly cleaned of Pb, Cu, Ag, and Au is thereby reduced from about 40% FeO to say 36% FeO, the cleaning being accomplished in the settler A, the eliminated values being recovered by tapping out as a metallic irony substance that can be used as a precipitating agent.

From A, the slag passes to B, which is a long trough-like furnace in which a set of electrodes furnish sufficient power to reduce the $Fe_2O_3$ to Fe and raise the temperature of the slag in proportion to the increase of its melting point owing to its FeO being removed; at the same time, pre-heated commercial calcium oxid (hot quick lime) is added together with some fluor-spar to keep the fluidity of the slag progressively within commercial limits.

The settler A and the furnace B are both provided with tap holes to the left from which iron or iron bearing compounds are periodically tapped.

Now, I have found that the reduction of FeO, out of a slag in a blast-furnace is ordinarily slow; due to the fact that the surfaces in contact are not sufficiently extensive to maintain a vigorous reaction, since the reducing agent "lies dead" on top of slag. Accordingly, I actively mix the slag with the reducing agent, i. e., dried soft-coal, by means of a plurality of jets of carbon monoxid impinging on a stream of coal or other means. If for any reason, the slag is not "boiling" at a proper rate, some cast-iron chips or shot is cautiously added. The $Fe_3C$ in this reacts quickly with the FeO in the slag; forming CO and $CO_2$; which makes a boiling action under control.

The slag is thus progressively de-oxidized and a product is continuously made possessing a gradually lowered content of FeO; until the percentage reaches about 2.59% FeO; whereupon it is taken to C for final reduction as hereinafter described.

At any desired point in the process, an intensive reducing agent (as calcium carbid) is added should commercial conditions warrant and make it advisable in place of electrically generated heat.

The gas, if otherwise so high in $CO_2$ as to oxidize the electrodes seriously, may be passed through my electric-slagging producer F and changed to CO. My preferred form of an electric slagging producer comprises an apparatus resembling a slag reducing furnace in which supernatant coal or coke is contained and through the left side of which furnace is blown a mixture containing 85% CO and 15% $CO_2$ passing through the supernatant carbonaceous material, absorbing heat from the slag and passing out to the right in the form of a gas analyzing approximately 99.8% CO and .2% $CO_2$. In such a slagging producer the mineral components of the coal or coke are absorbed continuously by the slag. This can well be an integral part of the furnace, by being separated from the main chamber thereof by a "curtain wall", so that none of the heat of the hot gases will be wasted. Thus, there will be provided a down-dropping arch that almost reaches the level of the slag, so that back of this, the coal will be floating on the slag. The ash from the coal will be absorbed by the slag. Preferably, the general reducing and electro-metallurgical conditions of B will be such that the electrode loss per ton of product will be less than 7 lbs.

Now, as the slag flows toward the exit of the furnace B, it becomes lower and lower in FeO, and it progressively contacts in said furnace B with a counter-current of iron having as the slag progresses a lower and lower content of carbon and silicon. It will be understood that the iron is reduced in drops as is usual in such reduction and flows to the tap-hole at the left where it is tapped at short intervals or continuously, if desired. The bottom of the furnace B is inclined in the direction opposite to the flow of the slag, and the movement of the inclined bottom and tapping will cause a counter-current thereof. The iron is thus subjected to a decarbonizing and desiliconizing action until it ultimately leaves the furnace practically as a crude steel or "pig-steel" analyzing more or less uniformly 99.50% Fe; although no express attempt is made to eliminate the manganese. However, the same or a similar counter-current electric furnace will, if worked slower, largely eliminate the manganese from the steel by forcing it into slag flowing toward the exit of the furnace; thus yielding a steel having a very low manganese content.

The steel (free from large amounts of C., Si and other impurities) is now tapped into a tilting electric furnace G as of the Heroult type, and is therein "dead-killed" and refined to a constant and desired composition and is thereupon "shotted" for use as a precipitating agent or cast into ingots for rolling or other conventional commercial use.

In C, which is a vertical coke resistance furnace with Acheson graphite ring electrodes, the slag containing 2.5% FeO or 1.93% Fe is reduced until it contains only a trace of Fe; thus simultaneously making pig-iron or ferrosilicon, as may be desired. The reason for the use of C is that perfect contact between slag and coke is attained.

From C, the slag goes to D, where it is heated to good fluidity and it is thereupon blown at E into a cement or into a mineral manure, as desired according to the teachings of my co-pending application, filed Feb. 2, 1915, Serial No. 5787.

In the Lake Superior region, there exists a vast quantity of so-called "taconite", i. e., the original igneous rock from which hematite deposits were derived. This and "jasper" is sometimes nearly a chemically pure ferrous silicate and often is so. I propose to use my process for treating this material by first heating in a pre-heater and electrically fusing it, or by simply melting it in a blast-furnace or in a reverberatory furnace, according to the price of electricity, coal and coke. Thereupon my process will proceed as hereinabove described.

All these operations can be done in fewer units. Thus A can be eliminated and a conventional settler used. F can be combined with B. B can do work for C and D, as well as its own. D can be eliminated as "pig steel" can be sold direct, or the "pig steel" can be "shotted" or granulated and used direct as a precipitating or reducing agent.

It is usually preferable to desulfurize slag in passing from A to B by blowing a current of warm air through it at a point in advance of where the reducing carbon is added, although some sulfur is always eliminated in A and FeO in slag in B desulfurizes to a slight extent and to a great extent in G.

Having thus revealed this invention, I claim as new and desire to secure the following combinations of steps and elements, or equivalents thereof, by Letters Patent of the United States:—

1. A process for settling lead or copper blast furnace slag which comprehends creating strongly reducing conditions in the absence of slag-forming conditions and maintaining the slag at a sufficient fluidity to enable the iron bearing products to settle, and then tapping said products for subsequent use.

2. A process for adapting a slag for the recovery of its iron values which comprehends maintaining it at a high temperature under strongly reducing conditions to effect the precipitation of certain non-ferruginous impurities, and then oxidizing the slag to eliminate sulfur.

3. A process for recovering iron values from slag which comprehends subjecting the molten slag to high temperatures under reducing conditions to precipitate matte; then blowing air through the molten slag to oxidize sulfur; and then actively subjecting the slag to reducing conditions to precipitate iron.

4. A process for making pig steel from a lead or copper blast furnace slag which comprehends progressively reducing to iron the FeO content of the slag by subjecting it progressively to iron having a progressively diminished carbon content.

5. A process for making a steel-like product from a blast furnace slag which comprehends causing the slag to flow in one direction and simultaneously reducing it with carbon and carbon monoxid and causing the underlying molten iron to stream in the opposite direction whereby the portions of the iron rich in carbon will be exposed to the portions of the slag poor in FeO and conversely.

6. A process for making a steel-like product from a blast furnace slag which comprehends causing the slag to flow in one direction and causing the underlying molten iron to stream in the opposite direction whereby the portions of the iron rich in silicon will be exposed to the portions of the slag poor in FeO and conversely.

7. A process for making a steel-like product from a blast furnace slag which comprehends causing the slag to flow in one direction and causing the underlying molten iron to stream in the opposite direction whereby the portions of the iron rich in manganese will be exposed to the portions of the slag poor in FeO and conversely.

8. A process of recovering metallic values from a slag which comprehends forming a fused bath of said slag, and then reducing said slag by projecting solid reducing particles thereinto by means of a jet of non-oxidizing gas.

9. A process for smelting iron-bearing slag which comprehends maintaining it molten by means of internally generated heat and then reducing said slag by a blast of reducing gas carrying a solid reducing agent, whereby the reducing action may be promoted.

10. A process for smelting iron bearing slag which comprehends maintaining it molten by means of internally generated heat and then reducing said slag by blasts of reducing gas of increasing intensity carrying suitably controlled amounts of solid reducing agent, whereby the reducing action may be promoted.

11. A process for reducing an iron bearing slag which comprehends causing the molten slag to infiltrate through an internally heated column of granular reducing agent.

12. A process which comprehends continuously subjecting an iron-bearing slag to reducing conditions to recover the iron as pig steel; then adding a calcium-bearing material; and then finally dividing the resultant product.

13. A process of smelting a natural iron silicate which comprehends fusing said iron silicate; then adding a calcium bearing material to enhance the fluidity of the slag; and reducing said slag to precipitate pig-steel.

14. A process for smelting natural iron silicate which comprehends fusing the raw material; subjecting the fused material to reducing conditions to precipitate pig-steel therefrom; and adding calcium-bearing material to the reduced portions of said slag to compensate for the decreased basic character of the slag resulting from the elimination of FeO.

15. A process which comprehends making continuously an iron compound low in carbon by employing a current of slag of a commercially non-uniform character by means of a furnace operated by internally generated heat; then passing said iron-bearing compound into a refining furnace, whereby a product of controlled commercial characteristics may be intermittently formed.

16. A process which comprehends making continuously an iron compound low in carbon by employing a current of slag of a commercially non-uniform character, by means of a furnace operated by internally generated heat; then storing the same for an indefinite period; and then passing said iron-bearing compound into a refining furnace whereby a product of controlled commercial characteristics is intermittently formed.

In witness whereof, I hereunto subscribe my name, as attested by the two subscribing witnesses.

WOOLSEY McA. JOHNSON.

Witnesses:
M. J. COOPER,
B. COOKE.